tics processing units, from each of the
graphics processing units to a corresponding one of a plural-
ity of print head controllers, with the rendered tiles transmit-
ted at a higher frequency than a frequency at which the plu-
rality of tiles is output from each print head controller. The
rendered tiles are repeatedly transmitted until each print head
controller completes output of the previous band.
United States Patent
Qian et al.

(10) Patent No.: US 9,152,894 B2
(45) Date of Patent: Oct. 6, 2015

(54) GPU-BASED RIP ARCHITECTURE

(71) Applicant: CANON KABUSHIKI KAISHA, Tokyo (JP)

(72) Inventors: Lena Qian, Artarmon (AU); Zachary Theodore Warren, Lane Cove (AU); Andrew Peter Downing, Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/849,653

(22) Filed: Mar. 25, 2013

(65) Prior Publication Data

US 2013/0258358 A1 Oct. 3, 2013

(30) Foreign Application Priority Data

Mar. 29, 2012 (AU) ................................ 2012201865

(51) Int. Cl.
*H04N 1/62* (2006.01)
*G06K 15/02* (2006.01)
*G06K 15/10* (2006.01)

(52) U.S. Cl.
CPC ........ *G06K 15/1813* (2013.01); *G06K 15/1857* (2013.01); *G06K 15/1894* (2013.01); *G06K 15/10* (2013.01)

(58) Field of Classification Search
None
See application file for complete search history.

(56) References Cited

U.S. PATENT DOCUMENTS

| 4,752,894 | A | * | 6/1988 | Deering et al. ................. 358/1.9 |
|---|---|---|---|---|
| 5,594,860 | A | * | 1/1997 | Gauthier ....................... 345/543 |
| 6,234,605 | B1 | * | 5/2001 | Hilton ............................. 347/42 |
| 6,860,203 | B2 | | 3/2005 | Danilo et al. |
| 2002/0121209 | A1 | * | 9/2002 | Danilo et al. ................. 101/485 |
| 2006/0044584 | A1 | * | 3/2006 | Sobczak ....................... 358/1.13 |
| 2008/0086642 | A1 | * | 4/2008 | Takahashi ..................... 713/176 |
| 2009/0244610 | A1 | * | 10/2009 | Mizutani et al. ............. 358/1.15 |
| 2011/0148958 | A1 | * | 6/2011 | Haas et al. ........................ 347/9 |

FOREIGN PATENT DOCUMENTS

WO 2011/036069 A1 3/2011

OTHER PUBLICATIONS

Recker, John. I-Jong Lin, Ingeborg Tastl. "A GPU Accelerated PDF Transparency Engine." Proceedings of IS&T/SPIE Electronic Imaging 2011, Parallel Processing for Imaging Applications. Jan. 24-25, 2011, San Francisco, CA. Ed. John D. Owens, I-Jong Lin, Yu-Jin Zhang, Giordano B. Beretta. Jan. 24, 2011: SPIE vol. 7872. pp. 78720T-1 to 78720T-11.

* cited by examiner

*Primary Examiner* — Benny Q Tieu
*Assistant Examiner* — Haris Sabah
(74) *Attorney, Agent, or Firm* — Canon U.S.A., Inc. IP Division

(57) ABSTRACT

A method of printing document data in page description language format using a plurality of graphics processing units. The plurality of tiles representing the document using the assigned graphics processing units are rendered in parallel with one another, and the rendered tiles are transmitted, bypassing the central processing units, from each of the graphics processing units to a corresponding one of a plurality of print head controllers, with the rendered tiles transmitted at a higher frequency than a frequency at which the plurality of tiles is output from each print head controller. The rendered tiles are repeatedly transmitted until each print head controller completes output of the previous band.

17 Claims, 11 Drawing Sheets

GPU-BASED RIP ARCHITECTURE

REFERENCE TO RELATED PATENT APPLICATION(S)

This application claims the benefit under 35 U.S.C. §119 of the filing date of Australian Patent Application No. 2012201865, filed 29 Mar. 2012, hereby incorporated by reference in its entirety as if fully set forth herein.

TECHNICAL FIELD OF INVENTION

The current invention relates to the field of raster image processing for high-speed digital printing presses.

DESCRIPTION OF BACKGROUND ART

Increasing speed of digital printers has created a need for matching high speed RIP (Raster Image Processing) systems. An RIP system converts Page Description Language (PDL) data, such as Portable Document Format (PDF) developed by Adobe Systems Inc., or XPS developed by Microsoft Corporation, into pixel data that can be used as input to a digital printer.

Traditionally RIP systems have utilized general purpose processors (CPUs) or custom hardware. Recently, Graphics Processing Units (GPUs), originally designed for 3D rendering applications such as computer games and computer-aided design (CAD), have become very powerful, and provide much higher performance to price ratio than general purpose CPUs. A RIP system built with GPUs may be cheaper than an equivalently performing CPU based system.

There are several existing examples of using GPUs in RIP systems. These existing systems typically comprise a host system containing a CPU, a main memory and one or more GPU cards connected by a peripheral bus, such as PCI-e. Each GPU card contains a graphics processing unit (GPU), a memory and one or more video output interfaces for connecting display devices. In one known GPU-based RIP system, pixels rendered on a GPU are transferred back to host system main memory, where additional colour processing may be performed by a general purpose processor (CPU). In alternative known systems, rendered pixels are transferred from memory associated with a GPU to a printer, via another device connected to a peripheral bus such as, for example, a PCI-e network card. Transferring the pixel data from GPU to main memory and from main memory to another device may require more bandwidth than such a peripheral bus can provide. In this case, the GPUs will not be used to their full potential due to the bottleneck of output bandwidth from the transfer to the CPU or a network interface.

One known system addresses the above problem by compressing pixel data before sending the compressed pixel data across a peripheral bus. Although the data transfer time may be reduced, the extra time required for compression, data transfer and decompression negates the benefit.

SUMMARY OF THE INVENTION

It is an object of the present invention to substantially overcome, or at least ameliorate, one or more disadvantages of existing arrangements.

According to a first aspect of the present disclosure, there is provided a method of rendering a document data in page description language format using a plurality of graphics processing units via video interface, said method comprising:

converting the document data to a set of rendering commands corresponding to a plurality of bands, using at least one central processing unit, wherein each of the plurality of bands includes a plurality of tiles and each of the tiles included in a band is associated with one of a plurality of swathes;

assigning each of the plurality of tiles to one of the plurality of graphics processing units in accordance with a swathe associated with each of the plurality of tiles;

rendering the plurality of tiles representing the document using the assigned graphics processing units in parallel with one another;

transmitting the rendered tiles from each of the graphics processing units to a corresponding one of a plurality of print head controllers, bypassing the central processing units, wherein the rendered tiles are transmitted at a higher frequency than a frequency at which the plurality of tiles is output from each print head controller, and the rendered tiles are repeatedly transmitted until each print head controller completes output of the previous band; and outputting, from each of the print head controllers, the rendered tiles forming a complete band for printing the rendered tiles.

According to still another aspect of the present disclosure, there is provided a system for printing document data in page description language format using a plurality of graphics processing units via a video interface, said system comprising:

a memory for storing data and a computer program;

a processor coupled to said memory for executing said computer program, said computer program comprising instructions for:

converting the document data to a set of rendering commands corresponding to a plurality of bands, using at least one central processing unit, wherein each of the plurality of bands includes a plurality of tiles and each of the tiles included in a band is associated with one of a plurality of swathes;

assigning each of the plurality of tiles to one of the plurality of graphics processing units in accordance with a swathe associated with each of the plurality of tiles;

rendering the plurality of tiles representing the document using the assigned graphics processing units in parallel with one another;

transmitting the rendered tiles from each of the graphics processing units to a corresponding one of a plurality of print head controllers, bypassing the central processing units, wherein the rendered tiles are transmitted at a higher frequency than a frequency at which the plurality of tiles is output from each print head controller, and the rendered tiles are repeatedly transmitted until each print head controller completes output of the previous band; and outputting, from each of the print head controllers, the rendered tiles forming a complete band for printing the rendered tiles.

According to still another aspect of the present disclosure, there is provided a non-transitory computer readable medium having a computer program stored thereon for printing document data in page description language format using a plurality of graphics processing units, said program comprising:

code for converting the document data to a set of rendering commands corresponding to a plurality of bands, using at least one central processing unit, wherein each of the plurality of bands includes a plurality of tiles and each of the tiles included in a band is associated with one of a plurality of swathes;

code for assigning each of the plurality of tiles to one of the plurality of graphics processing units in accordance with a swathe associated with each of the plurality of tiles;

code for rendering the plurality of tiles representing the document using the assigned graphics processing units in parallel with one another;

code for transmitting the rendered tiles from each of the graphics processing units to each of a corresponding one of a plurality of print head controllers, bypassing the central processing units, wherein the rendered tiles are transmitted at a higher frequency than a frequency at which the plurality of tiles is output from each print head controller, and the rendered tiles are repeatedly transmitted until each print head controller completes output of the previous band; and code for outputting, from each of the print head controllers, the rendered tiles forming a complete band for printing the rendered tiles.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1A:
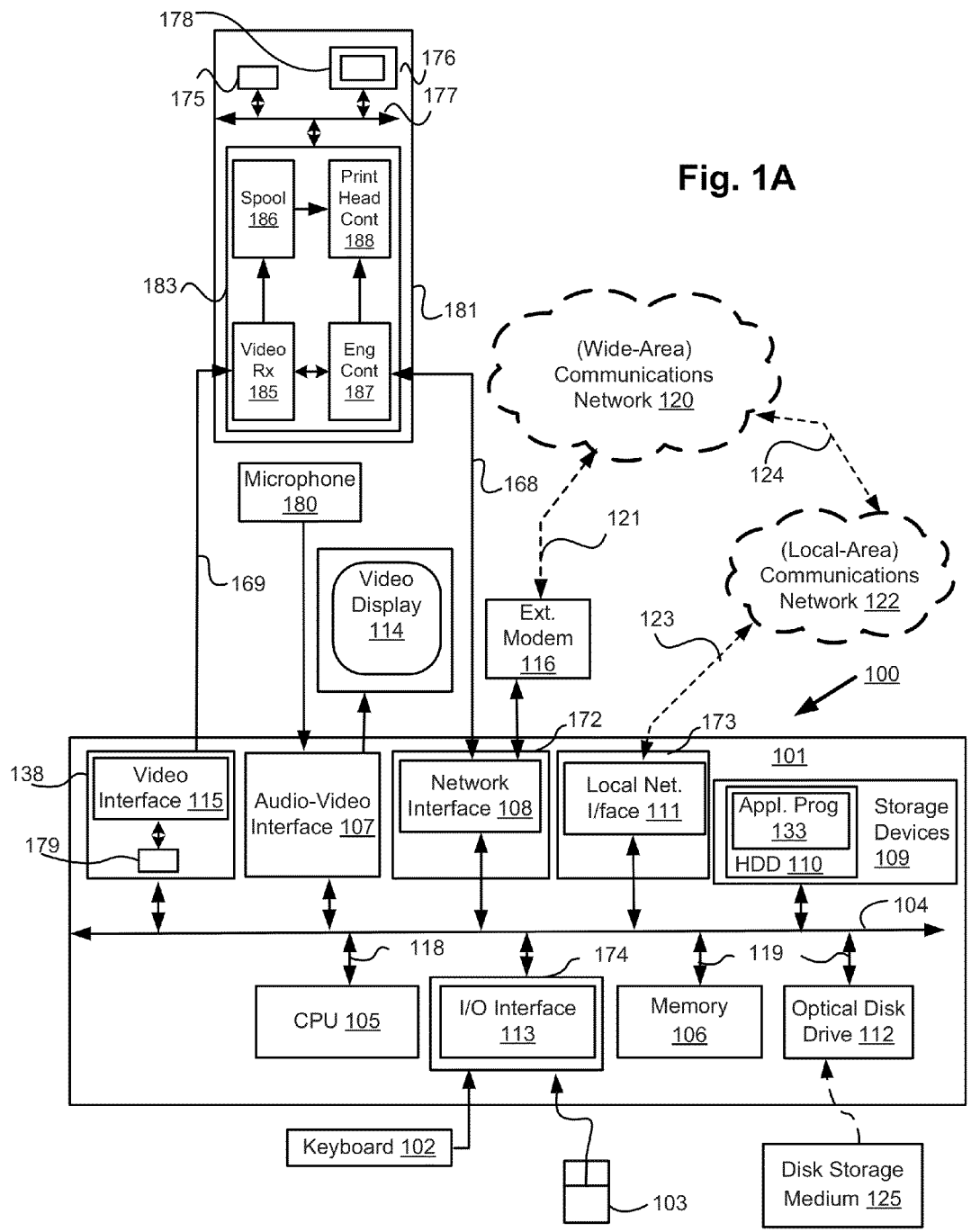
FIGS. 1A and 1B is a schematic block diagram of a computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

A GPU-based RIP computer system 100 is described below with reference to FIGS. 1A and 1B. The computer system 100 may be used for implementing printing methods as described below.

The system 100 comprises a Graphics Processing Unit (GPU) card 138 configured within a computer module 101. As seen in FIG. 1A, the GPU card 138 comprises a memory unit 179. The memory unit 179 is typically formed from semiconductor random access memory (RAM). The GPU card 138 also comprises a video interface 115.

The computer module 101 is connected to an associated print controller 183 configured within a printer 181. The computer module 101 is also connected, via a network card 172, to an engine controller 187 of the print controller 183. The print controller 183 also comprises a video receiver 185.

GPU cards used with conventional software applications (e.g., games and computer aided design (CAD)) transfer rendered pixels directly to a display device via a standard video interface, such as the Digital Video Interface (DVI-D) standard developed by the Digital Display Working Group (DDWG) or DisplayPort developed by the Video Electronics Standards Association (VESA).

A video interface, such as the video interface 115 associated with the GPU card 138, may be configured to continuously transmit an image held in the memory 179 of the GPU card 138. The image is typically transmitted at a fixed rate (e.g., a refresh rate of video display device 114) and at a resolution that the GPU card 138 allows. An area of the memory 179 where the transmitted image is held is called a "frame buffer".

An audio-video interface 107 connects the computer module 101 to a video display 114. The audio-video interface 107 may be embedded, for example, in another GPU card.

The computer system 100 described here may be configured to perform "double buffering". The GPU card 138 in the computer system 100 comprises two frame buffers which may be configured within memory 179. The GPU card 138 renders into a first one of the frame buffers while a second one of the frame buffers is read by the video receiver 185 of the print controller 183. Once the GPU card 138 has finished rendering a frame, roles of the two frame buffers are swapped. In particular, the first frame buffer is read by the video receiver 185 of the print controller 183 and the GPU card 138 begins rendering into the recently output second frame buffer.

The computer system 100 may also be configured to perform an additional synchronization function, called "Vsync", where the CPU 105 stops the frame buffers from being swapped while one of the frame buffers is being read by the video receiver 185.

Double buffering and Vsync may be used by the computer system 100 to avoid transmitting incomplete images.

The GPU card 138 transmits contents of one of the frame buffers to video receiver 185 of the print controller 183, at a fixed video rate, regardless of whether content within the frame buffer has changed. Rendered image tiles are transmitted to a spool (or frame buffer) 186 of the print controller 183 at a higher frequency (rate) than the frequency (rate) at which contents of the spool 186 is output from the print controller 183.

The computer system 100 may be configured so as to respond to an external signal indicating when an image should be captured and transmitted to the video receiver 185 of the printer 181. The external signal may be triggered by pressing a button, for example, on keyboard 102. Alternatively, the external signal may be triggered by an HTTP command received on network interface 108.

The size of an image stored in one of the frame buffers configured within the memory 179 may be smaller than a typical print image size. The computer system 100 may be configured to render printable images in tiles where each tile is small enough to fit into one of the frame buffers configured within memory 179. The image or the content in one of the frame buffers of the memory 179 may be referred to as a "frame".

As seen in FIG. 1A, the printer 181 typically includes at least one processor unit (CPU) 175 and a memory unit 176. The memory unit 176 typically has semiconductor random access memory (RAM) and semiconductor read only memory (ROM). The CPU 175, memory 176 and print controller 183 of the printer 181 typically communicate via an interconnected bus 177. The print controller 183 comprises the video receiver 185 for receiving input image data and a spool 186 for queuing the received image data. The print controller 183 also comprises controllers, collectively referred to as an engine controller 187, for performing various electromechanical or electro photographic functions of the printer 181 (e.g., marking and transporting paper). The print controller 183 also comprises a print head controller 188 for controlling a print head of the printer 181. The engine controller 187 and print head controller 188 may be collectively be referred to as a "print engine". In one implementation, the print engine is a high-speed, high-volume press print engine.

As seen in FIG. 1A, the computer system 100 comprises the computer module 101, to which may be connected user input devices such as the keyboard 102 and a mouse pointer device 103, and output devices including the printer 181, and the display device 114 for local user feedback. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120. A PDL print job may be delivered to the computer module 101 via the network 120.

The computer module 101 typically includes at least one processor unit (CPU) 105, and the memory unit 106. The CPU 105 is typically a multi-processor device having multiple cores for execution of a plurality of threads in a distributed manner permitting accelerated processing. The memory unit 106 typically has semiconductor random access memory (RAM) and semiconductor read only memory (ROM).

The computer module 101 also includes a number of input/output (I/O) interfaces including the audio-video interface 107 and the video interface 115 of the GPU card 138 that couple to the video display 114 and to the video receiver 185 of the printer, respectively.

The computer module 101 also includes an I/O interface card 174, comprising an I/O interface 113, that couples to the keyboard 102, mouse 103 or other human interface device (not illustrated).

The network card 172 also comprises a network interface 108 for the external modem 116 and the printer 181.

As described above, the network interface 108 is connected to the engine controller 187. In some implementations, the modem 116 may be incorporated within the computer module 101, for example, within the network card 172.

The computer module 101 also comprises a local network interface card 173 comprising a local network interface 111, which permits coupling of the computer system 100 via a connection 123 to a local-area communications network 122, known as a Local Area Network (LAN). PDL print jobs for the printer 181 may be provided to the computer system 100 via the network 122. As illustrated in FIG. 1A, the local communications network 122 may also couple to the wide network 120 via a connection 124, which would typically include a so-called "firewall" device or device of similar functionality. The local network interface 111 of the network card 173 may comprise an Ethernet circuit card, a Bluetooth® wireless arrangement or an IEEE 802.11 wireless arrangement; however, numerous other types of interfaces may be practiced for the interface 111.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 101. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 174 of the computer module 101 typically communicate via an interconnected bus 104 and in a manner that results in a conventional mode of operation of the computer system 100 known to those in the relevant art. For example, the CPU 105 is coupled to the system bus 104 using a connection 118. Likewise, the memory 106 and optical disk drive 112 are coupled to the system bus 104 by connections 119. Examples of computer platforms on which the described arrangements can be practised include IBM-PC's and compatibles, Sun Sparcstations, Apple Mac or a like computer systems.

One or more steps of the printing methods to be described may be implemented using the computer system 100 wherein the processes of FIGS. 1 to 9, may be implemented as one or more software application programs 133 executable within the computer system 100. In particular, the printing methods can be effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the printing methods and a second part and the corresponding code modules manage a user interface between the first part and the user.

One or more of the components 105 to 174 described here may also be implemented as one or more software code modules of the software application programs 133 executable within the computer system 100.

The software may be stored in a computer readable medium, including the storage devices described below, for example. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for high-speed printing.

The software 133 is typically stored in the HDD 110 or the memory 106. The software is loaded into the computer system 100 from a computer readable medium, and executed by the computer system 100. Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus for high-speed printing.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers (not shown) and user voice commands input via the microphone 180.

Figure 1B:
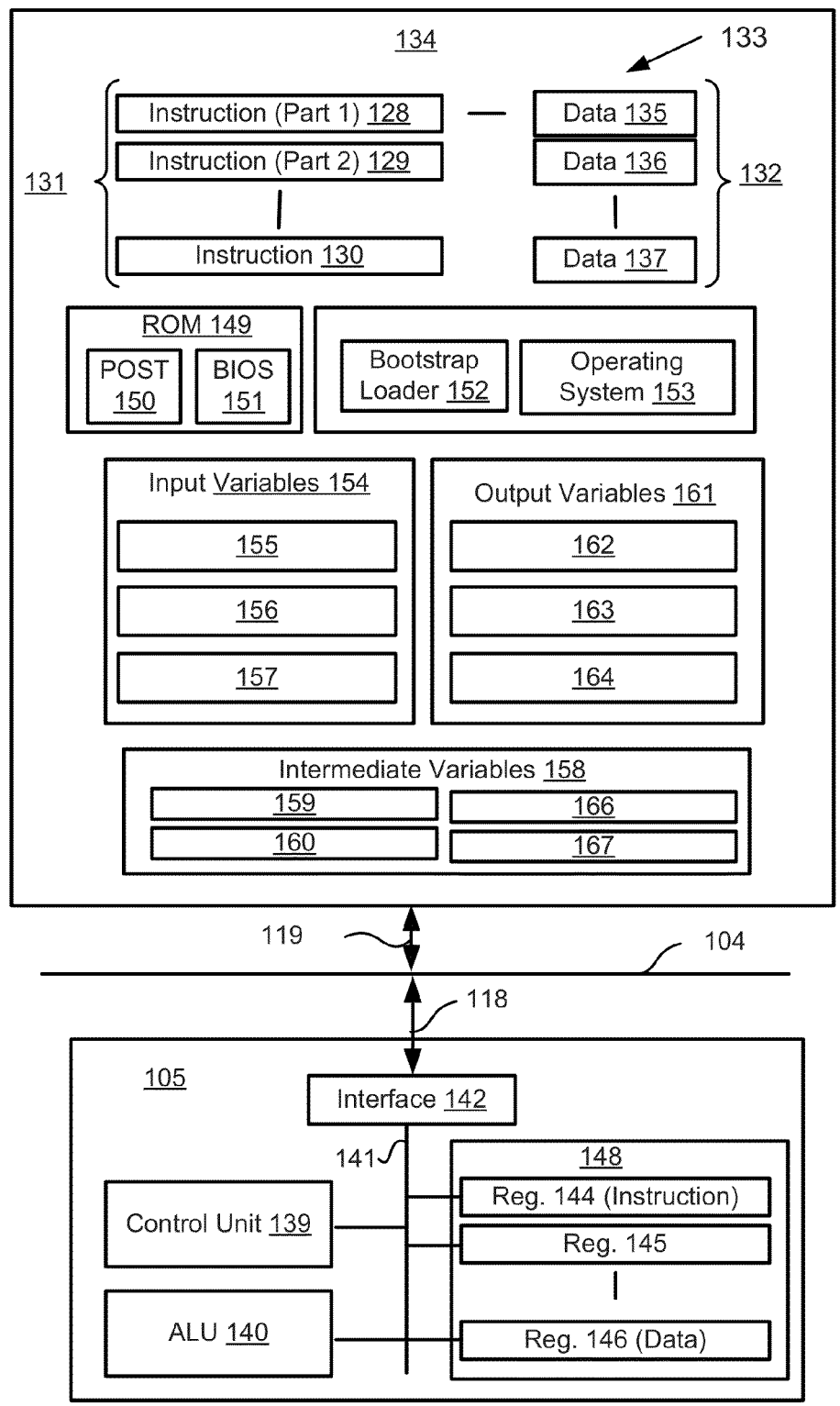

FIG. 1B is a detailed schematic block diagram of the CPU 105 and a "memory" 134. The memory 134 represents a logical aggregation of all the memory modules (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1A.

A hardware device such as the ROM 149 storing software is sometimes referred to as firmware. The POST program 150 examines hardware within the computer module 101 to ensure proper functioning and typically checks the CPU 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the CPU 105. This loads an operating system 153 into the RAM memory 106, upon which the operating system 153 commences operation. The operating system 153 is a system level application, executable by the CPU 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the CPU 105 includes a number of functional modules including a control unit 139, an arithmetic logic unit (ALU) 140, and a local or internal memory 148, sometimes called a cache memory. The cache memory 148 typically include a number of storage registers 144-146 in a register section. One or more internal busses 141 functionally interconnect these functional modules. The CPU 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the CPU 105 is given a set of instructions which are executed therein. The CPU 105 waits for a subsequent input, to which the CPU 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A.

The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the CPU 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 1 to 9 is associated with one or more segments of the program 133 and is performed by the register section 144, 145, 147, the ALU 140, and the control unit 139 in the CPU 105 working together to perform the fetch, decode, and execute cycles for every instruction in the instruction set for the noted segments of the program 133.

One or more steps of the methods to be described may also be implemented using the printer 181 wherein one or more steps of the processes of FIGS. 1 to 9, may be implemented as one or more software application programs 178 executable within the printer 181. The software application programs 178 are executed in a similar manner to execution of the application programs 133 executable within the computer module 101.

As described above, the print engine (i.e., comprising the engine controller 187 and print head controller 188) may be a high-speed, high-volume press print engine. In one implementation, the print engine of the printer 181 may be a high speed press print engine of a type referred to as a "web-fed digital press". In a web-fed digital press, paper passes through the print engine in a continuous sheet, called a web. The paper enters the print engine from a roll, passes through the print engine and exits on to another roll or into finishing equipment such as a cutter and folder.

Figure 6:
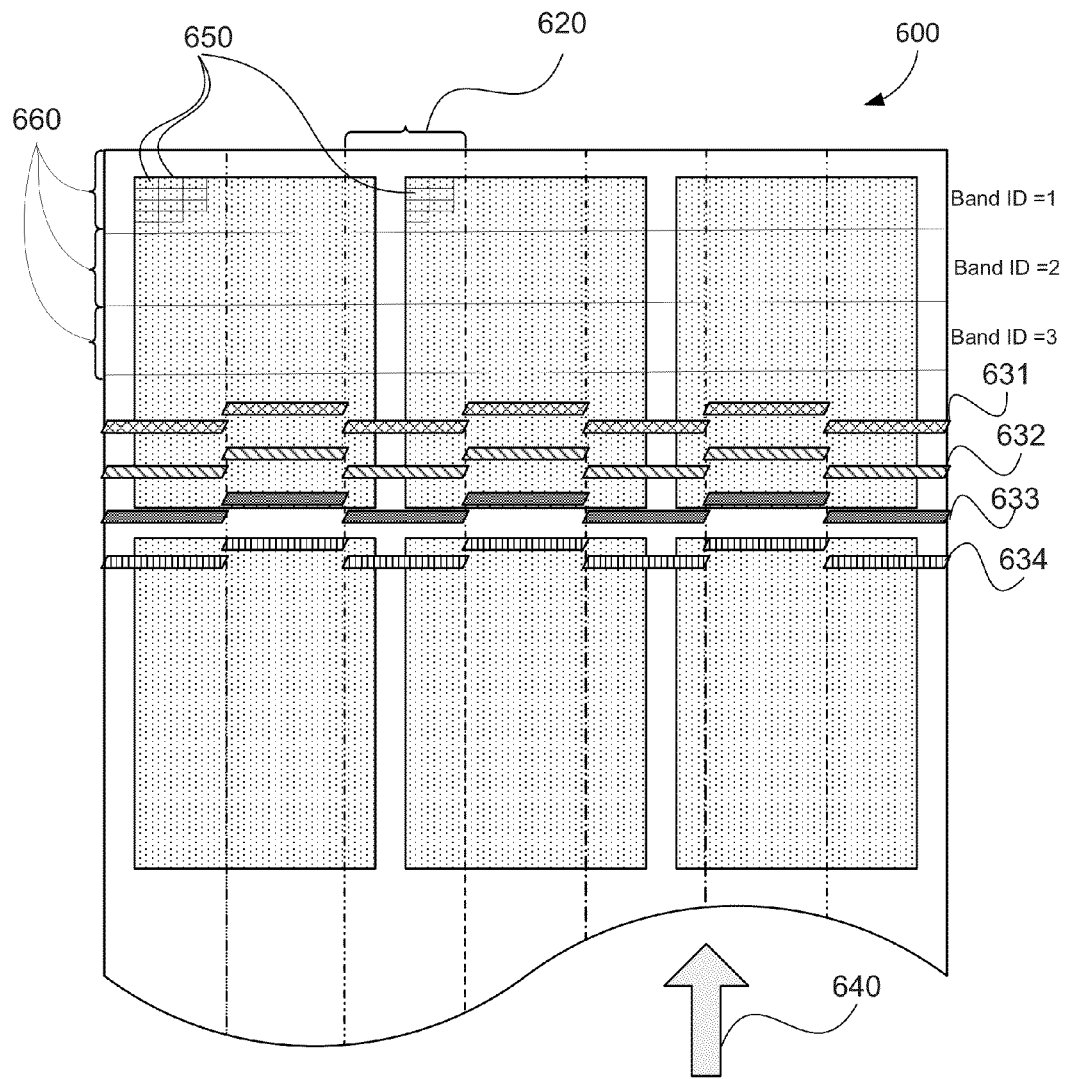
FIG. 6 is a diagram illustrating the relationship between print heads and paper web feed in a digital press.

FIG. 6 shows a printable web 600 and rows of print heads (e.g., 631, 632, 633 or 634) corresponding to Cyan, Magenta, Yellow or Black, respectively, of the print engine of the printer 181, when the print engine is a web-fed digital press. In this instance, the print heads (e.g., 631, 632, 633 or 634) are stationary and are arranged side-by-side in rows to span the width of the web 600. The printer 181 comprises at least one spanning set of print heads for each colour, as shown in FIG. 6. The portion of paper printed on by a single print head is referred to as a swathe (e.g., 620). A set of print heads that define a swathe (e.g., 620) are aligned in the direction 640 of travel of the web 600 through the printer 181. Each swathe (e.g., 620) has a plurality of bands 660 in a row in direction 640. Each band 660 has a plurality of tiles (e.g., 650). In the example of FIG. 6, some tiles are omitted. Each tile 650 is associated with a band identifier (ID) to specify which band each tile is located in.

The GPU card 138 connects to the print controller 183 via the video interface 115, bypassing the CPU 105. As described above, the print controller 183 comprises the video receiver 185, the spool 186, the engine controller 187 and the print head controller 188. The print controller 183 is connected to the network interface 108 via a connection 168 which provides a bidirectional communication channel. The print head controller 188 may communicate with the GPU card 138 via the bidirectional communication channel 168. The engine controller 187 indicates to the print head controller 188 how much ink from each print head (e.g., 631, 632, 633 and 634) should be released at a certain time and at a certain position on a piece of paper.

In the GPU-based RIP computer system 100, the document data in page description language format is converted to three dimensional (3D) drawing commands by an "Application Programming Interface" such as the Open Graphics Library (OpenGL) standard specification. Such an application programming interface may be implemented as one or more software code modules of the software application program 133 being executed by the CPU 105. OpenGL is a standard specification defining a cross-language, cross-platform API for writing applications that produce 2D and 3D computer graphics. OpenGL defines over two-hundred and fifty (250) different function calls which may be used to draw complex three-dimensional scenes from simple primitives.

Three dimensional (3D) drawing commands generated on the computer system 100 are rendered on the GPU card 138. Additional processing, such as colour conversion and halftoning, may also be performed on the GPU card 138 using OpenGL shaders or a general purpose GPU compute language such as OpenCL.

OpenCL is a framework for writing programs that execute across heterogeneous platforms consisting of CPUs, GPUs, and other processors. OpenCL includes a language, based on the ISO/IEC 9899:1999 version of the C programming language standard (or C99), for writing kernels (i.e., functions that execute on OpenCL devices), plus APIs that are used to define and then control platforms. OpenCL provides parallel computing using task-based and data-based parallelism.

The video interface 115 in the GPU card 138 transmits rendered images at a constant video rate, regardless of whether the frame buffer configured within the memory 179 has been updated or not. The video rate may be significantly higher than the rate at which the contents of the frame buffer are printed by the system 100. If the system 100 does not update and swap the frame buffers fast enough, duplicate images will be transmitted. The time taken to render drawing commands (e.g., OpenGL or other GPU graphic rendering APIs) depends on the number and complexity of drawing commands, so it is difficult to ensure that the frame buffers of the GPU card 138 are always swapped in time.

The print controller 183 is configured to discard duplicate images. The video receiver 185 may receive additional information identifying which image is to be printed and which image is a duplicate.

Figure 2:
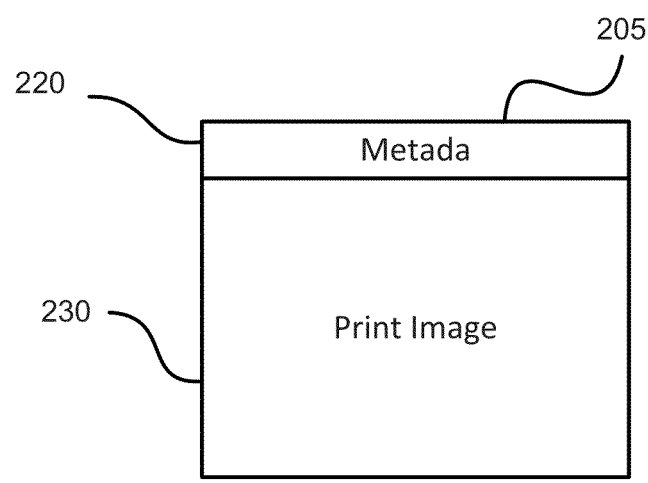
FIG. 2 shows an image frame containing metadata and a print image.

FIG. 2 shows an output image 205. As shown in FIG. 2, additional information associated with the image 205 may be provided by the system 100 by embedding extra information or metadata 220 in each output image 205 stored in the frame buffer configured within the memory 179 of the GPU card 138. Metadata may be embedded in the output image 205, for example, by creating images which are slightly larger than an intended print image 230. The metadata may be encoded in the non-printing area 220 of the output image 205. In one implementation, the video receiver 185 reads the metadata 220 in the output image 205 and adds the printable image area 230 to the spool 186.

The metadata 220 includes at least an identification number (or attribute) of a frame or an image in the frame buffer. The system 100 embeds a different identification number for each frame of a tile that is swapped into the frame buffer of the GPU card 138. The video receiver 185 checks the identification number (or attribute) of each image received directly from the GPU card 138, bypassing the CPU 105. If the identification number (or attribute) is different from the image before, then the image is added to the spool 186, otherwise the image 186 is discarded. The metadata 220 also includes a band identification number (band ID) to specify which band each rendered tile is located in.

The metadata 220 includes the size of the image, bit depth, number of colour channels, and the position of a tile in a full print image.

Video interfaces typically only support image formats suitable for display devices such as RGB (Red, Green Blue) with twenty-four (24) or thirty (30) bits-per-pixel. Printers typically use CMYK (Cyan, Magenta, Yellow or Black) image format with four (4) or eight (8) bits-per-pixel. In the case of spot colours, additional channels may be used. As the print image 230 has the print format, the video receiver 185 uses the metadata to interpret the received image in the correct format.

The video receiver 185 assembles tile images received from the GPU card 138 directly, bypassing the CPU 105, into a full print image or print band in the spool 186. The engine controller 187 is signalled when all the tiles of a print image or a print band are received and the print image or print band is complete.

To ensure each rendered image is sent to the printer 181, the system 100 waits for at least one refresh period before swapping content of the frame buffers, and also checks that the video receiver 185 has not asserted that the spool 186 is full and cannot receive more image data. The refresh period is also referred to as "wait time" for swapping the frame buffers.

Conventional video interfaces carry information in one direction. Thus, for such conventional video interfaces, the process of communicating between a GPU card, such as the GPU card 138, and a video receiver, such as the video receiver 185, is not possible. Therefore, the print controller 183 comprising the video receiver 185, as seen in FIG. 1A, has a connection 168 which provides an additional bidirectional communication channel between the computer module 101 and the print controller 183. Such a bidirectional communication channel 168 may be used to signal to the system 100 when the spool 186 is full and is unable to receive any more image data.

Some video interface standards such as DisplayPort have a low bandwidth bidirectional communication channel. However, such a channel is only available to a graphics driver, and is not capable of carrying notification messages that a spool (e.g., the spool 186) is full and cannot receive any more image data.

In another implementation, the computer module 101 comprises a plurality of GPU cards, which may be configured to communicate with each other. Data on one GPU card may be transferred to another GPU card in rendering images. In such an arrangement, a parallel computing architecture, such as Compute Unified Device Architecture (CUDA version 4 and above) and GPUDirect v2.0, may be used to support Peer-to-Peer communication. Alternatively, scalable link interface (SLI) technology may be used to allow multiple GPU cards to render a tile. For example, half of such a tile may be rendered on a master GPU card and the other half of the tile may be rendered on a slave GPU card. A resulting rendered image from the slave GPU card may be sent to the master GPU card which combines two half images into one image and then outputs the combined image to the frame buffer. Such an architecture may be used for synchronising a plurality of tiles associated with a complete swathe with one another. The complete swathe may be divided into the plurality of tiles, and hence the plurality of tiles is associated with the complete swathe.

CUDA is an architecture developed to provide developers access to a virtual instruction set and memory of parallel computational elements on GPUs. Using CUDA the GPU cards become accessible for general-purpose computation like CPUs. Unlike CPUs however, GPU cards have a parallel throughput architecture that emphasizes executing many concurrent threads slowly, rather than executing a single thread very quickly. Such parallel throughput architecture may be utilized in the rendering of the image tiles in parallel with one another, giving the unique advantage of fast rendering. Image rendering in CUDA may use different rendering pipeline to the OpenGL's rendering pipeline. CUDA also provides several advantages, including:

1. Scattered reads, which means that commands for rendering may be read from arbitrary addresses in memory;
2. Shared memory, which means that CUDA exposes a fast shared memory region (i.e., up to 48 KB L1 cache per Multi-Processor) that may be shared amongst threads. Such shared threads may be used as a user-managed cache, enabling higher bandwidth than is possible using texture lookups;
3. Faster downloads and read-backs to and from a GPU card; and
4. Full support for integer and bitwise operations, including integer texture lookups.

Data transfer between GPU cards may be direct, via GPU-Direct or SLI hardware. Such GPUDirect or SLI hardware may be used for load balancing.

In an implementation comprising a plurality of GPU cards, a tile may be dynamically assigned to a least busy GPU card for rendering and the rendered pixels transferred to another GPU card that associates to a targeted swathe of the tile. For example, a tile to be printed in swathe one (1) may be sent to GPU card two (2) for rendering, but rendered pixels of the tile are transferred back to GPU card one (1) and then passed to a corresponding swathe controller.

The allocation of a GPU card which does not belong to the swathe associated with the tile needs to be handled carefully. The data transfer time needs to be included for the total rendering time. For example, the GPU cards may be allocated as described above when total time of tile rendering on GPU card two (2) plus the pixel data transfer time from GPU card two (2) to GPU card one (1) is less than the total time of waiting time on GPU card one (1) and tile rendering time on GPU card one (1).

Figure 3A:
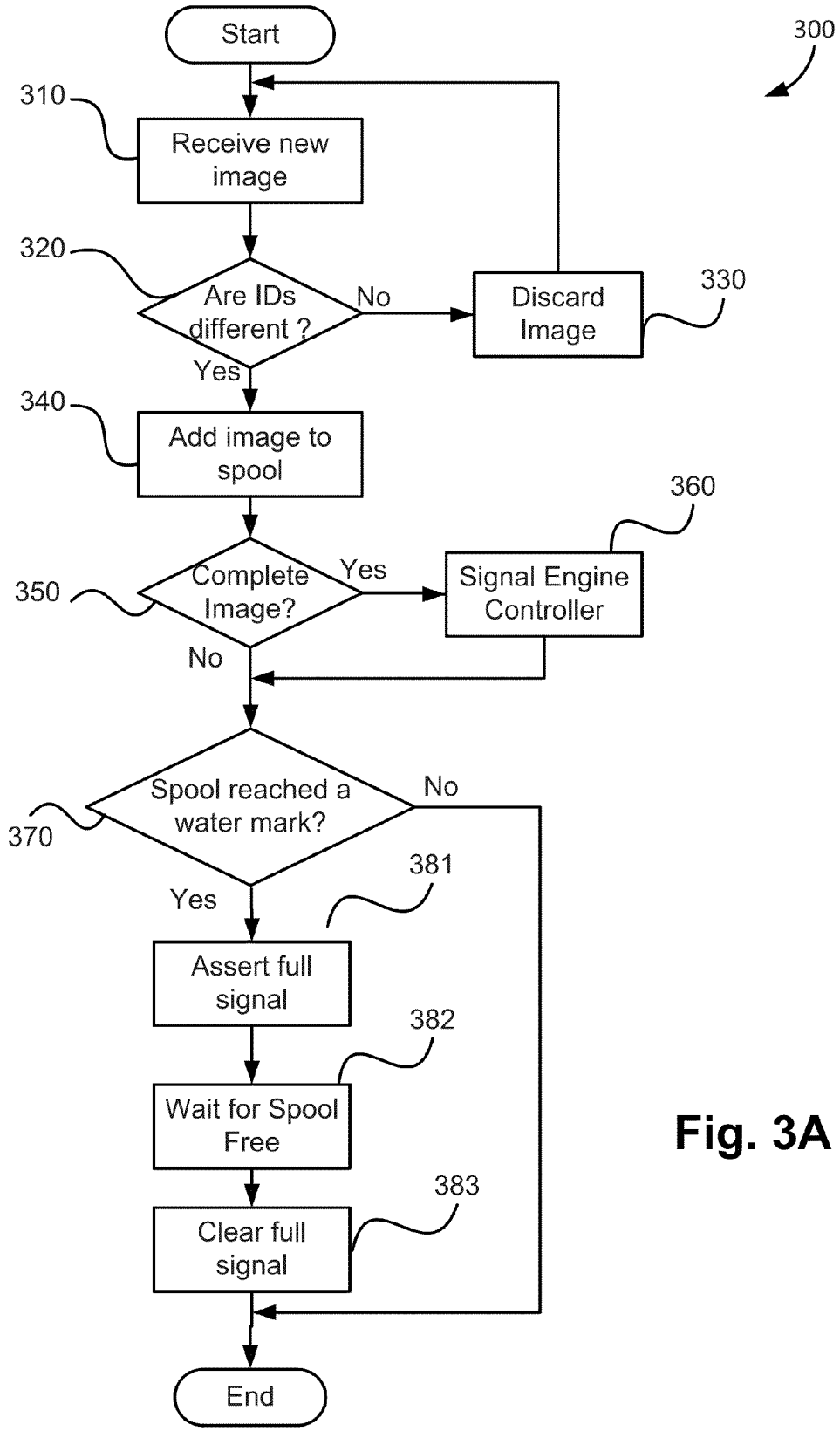
FIG. 3A is a flow diagram showing a method of receiving an image.

A method 300 of receiving an image will be described in detail below with reference to FIG. 3A. The method 300 may be implemented as one or more code modules of the software application program 178 resident in memory 176 of the printer 181 and being controlled in its execution by the print controller 183 under execution of the CPU 175.

The method 300 begins at image receiving step 310, where a new image is received by the video receiver 185 at a video rate, which is a rate higher than the rate at which contents of one of the frame buffers configured within memory 179 is printed by the system 100.

In one implementation, the image received at step 310 is a rendered tile of a page to be printed by the print controller 183. Tiles are constituted to form a print image band 660 which spans the width of the page. Each of the images received at step 310 has additional information in the form of an associated identification number (or attribute) which uniquely identifies the image or frame, as described above. For example, the identification number combines the band identification and tile identification numbers.

At comparing step 320, the print controller 183, under execution of the CPU 175, is used to compare the identification number associated with the image received at step 310 against the identification number of a previously received image. If the print controller 183 determines that the identification numbers (or attributes) are different, then the image is added to the spool 186 configured within memory 176 in spooling step 340. Otherwise the received image is discarded in discarding step 330.

In checking step 350, the print controller 183 determines if the image received at step 310 completes a print image band 660. If the received image completes a print image band, then the engine controller 187 is notified in signalling step 360 that the spool 186 contains data that is ready to be printed. A print image band 660 is completed when all the tiles 650 that constitute the band 660 have been received by the print controller 183 and stored in the spool 186. However, if the spool 186 is determined to be full in decision step 370, then the method 300 proceeds to step 381.

At asserting step 381, the video receiver 185 asserts a full signal and ignores any received images until the engine controller 187 releases some data from the spool 186 in releasing step 382. The full signal may be asserted at step 381 by modifying, for example, a full flag stored within the memory 176. The full signal is sent to the computer module 101 by the engine controller 187.

When data has been released from the spool 186 at step 382, the CPU 175 clears the asserted full signal at clearing step 383. In this instance, the video receiver 185 transmits a signal to the computer module 101 indicating that the print controller 183 may receive images again. The signal transmitted by the video receiver 185 at step 383 is transmitted to the computer module 101 via the engine controller 187 and the connection 168. Following step 383, the method 300 may be executed again for a next print image band.

Figure 3B:
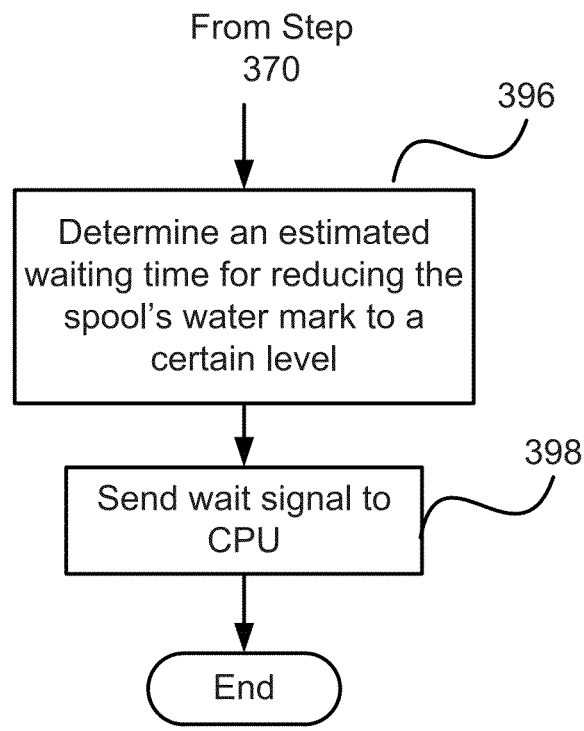
FIG. 3B is a flow diagram showing print flow control steps which may be used in the method of FIG. 3A.

Alternatively, steps 381, 382 and 383 of the method 300 may be replaced with print flow control steps 396 and 398 as shown in FIG. 3B. In particular, when the spool 186 is determined to have reached a water mark at decision step 370, the method 300 may proceed to step 396 instead of step 381.

As seen in FIG. 3B, at determining step 396, the CPU 175 determines an estimated waiting time to release the rendered tiles from the spool 186. The estimated waiting time may be determined based on an image receiving rate in the video receiver 185, a printing rate in print head controller 188 and/or a spool size in spool 186. Other factors may also be used to determine the estimated waiting time at step 396. Following step 396, the method 300 concludes at wait signal step 398, where the CPU 175 sends a wait signal together with the estimated wait time to the CPU 105.

A method 400 of rendering an image tile will be described in detail below with reference to FIG. 4. One or more steps of the method 400 may be implemented as one of more software code modules of the software application program 133 resident in the hard disk drive 110 and being controlled in its execution by the CPU 105.

The method 400 begins at setting step 405, where the CPU 105 sets an initial wait time. The initial wait time may be longer than the video refresh period and is set up for a rendered tile being swapped to the frame buffer configured within the memory 179 and the content of the frame buffer is received by the video receiver 185. The initial wait time is the period between two Vsync synchronization functions plus some overhead.

At assigning step 410, the CPU 105 assigns and sends commands for rendering a tile of a full print image to the GPU card 138. In response to receipt of the commands, the GPU card 138 renders the tile into the memory 179 of the GPU card 138.

In another implementation, the computer module 101 may contain a plurality of GPU cards. In this instance, at step 410, the CPU 105 selects one of the plurality of GPU cards of the computer module 101 in accordance with a swathe 620 associated with each of the plurality of tiles 650, assigns an image tile to the selected GPU card and renders the tile on the selected GPU card. The allocation of an output image 205, as seen in FIG. 2, is performed in step 410 of the method 400. The rendered image is at the print image area 230 within the output image 205.

In an implementation where double buffing is being used in the frame buffer, there are two frame buffers. One of the frame buffers is called a "render" frame buffer and the other frame buffer is called a "transmit" frame buffer. A tile may be rendered directly to the render frame buffer or the tile may be rendered first to a texture and then copied to the render frame buffer configured in memory 179 of the GPU card 138.

Figure 4:
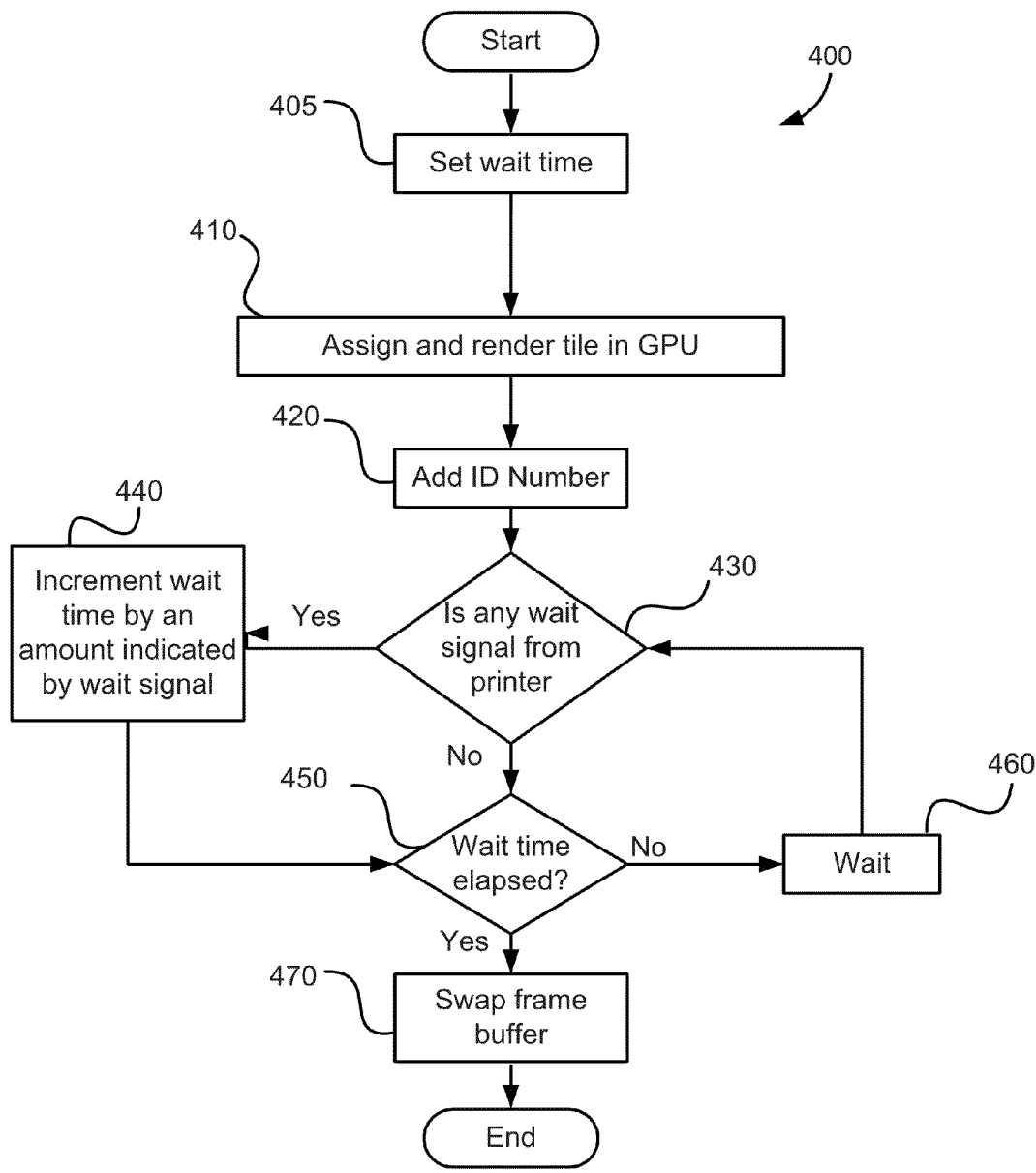
FIG. 4 is a flow diagram showing a method of rendering an image tile.

In the method 400 of FIG. 4, the tile is rendered to the render frame buffer directly. Data in the transmit frame buffer may be transmitted periodically via the video interface 115 to the printer 181. At step 420, a new identification number of a frame is added by the CPU 105 to the metadata 220 associated with the output image 205 of the rendered tile resulting from step 410. Also, band identification numbers (band IDs) to specify which band each rendered tile is located in are added to the metadata 220 at step 420. The metadata may include the tile number, tile size, colour bit depth, etc.

In decision step 430, if the CPU 105 determines that the print controller 183 has sent a wait signal (as at step 398) to the CPU 105, then the method 400 proceeds to step 440. The wait signal sent from the print controller 183 indicates that the GPU card 138 should wait to send more rendered tiles to the printer 181 until the spool 186 in the print controller 183 has been reduced to a certain size. At incrementing step 440, the waiting time is incremented by the estimated waiting time from the wait signal. The method 400 proceeds to decision step 450.

At decision step 450, if the CPU 105 determines that the wait time has elapsed (i.e., the data in the transmit frame buffer has been received by the video receiver 185 of the printer 181), then the method 400 proceeds to step 470. Otherwise, the method 400 proceeds to step 460.

Then at waiting step 460, the CPU 105 waits for a predetermined period before the method 400 returns to step 430.

The method 400 concludes at step 470, where the CPU 105 sends a signal to the GPU card 185 so that the rendered tile in the render frame buffer (i.e., resulting from step 410) is swapped into the transmit frame buffer configured within the memory 179.

The method 400 may be executed again following step 470 to render a next image tile at step 405 of the method 400.

Figure 5:
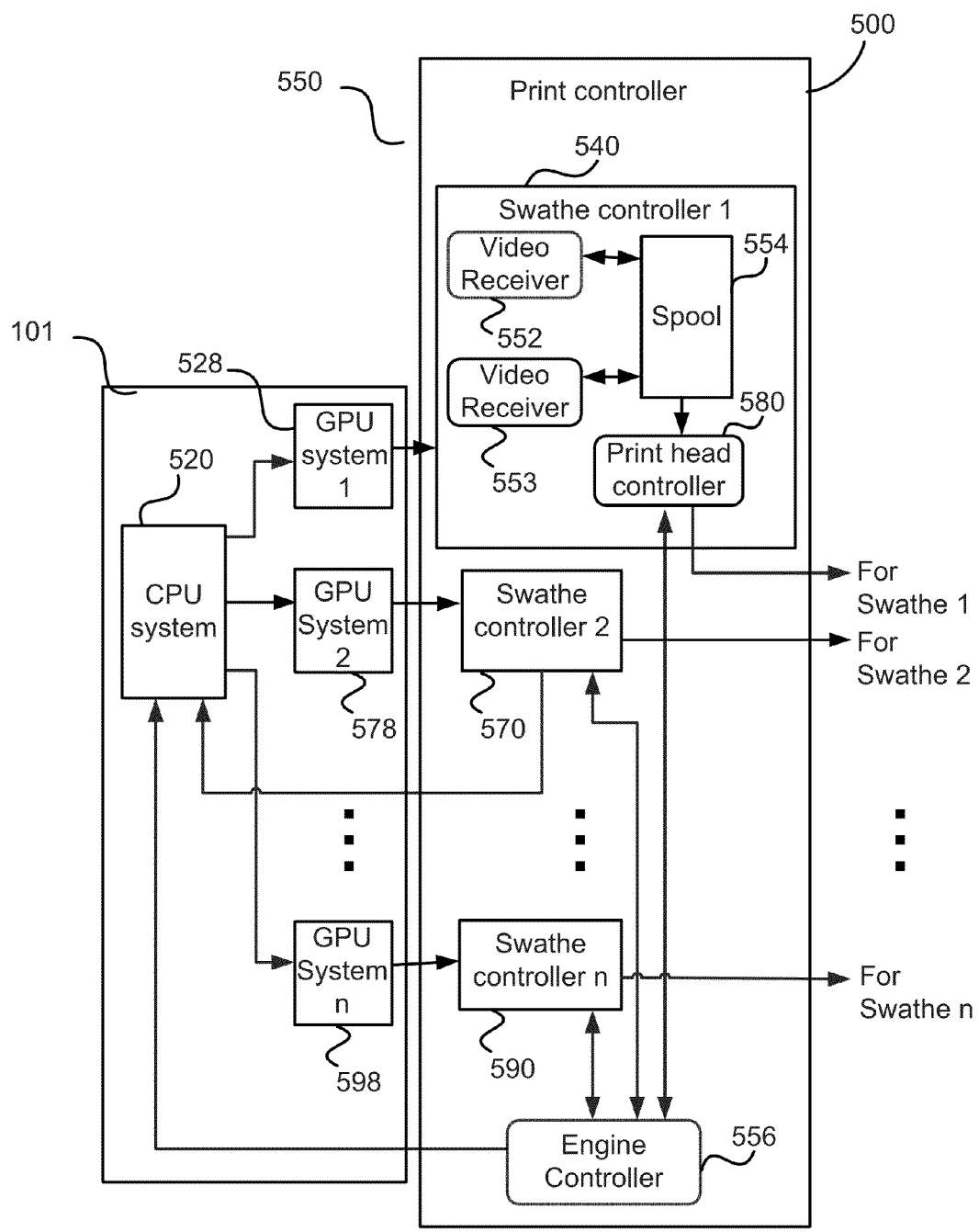
FIG. 5 is a schematic block diagram showing the computer system of FIG. 1 comprising a plurality of GPUs and associated video receivers.

In one implementation, the computer module 101 may comprise a plurality of GPU systems 528, 578 and 598 as seen in FIG. 5. In this instance, an associated print controller 500 may also comprise a plurality of video receivers 552 and 553, as shown in FIG. 5, if each of the GPU systems 528, 578 and 598 has a plurality of video interfaces similar to the video interface 115. Each of the GPU systems 528, 578 or 598 may be configured to have one (1) GPU card (e.g., 138) which includes multiple (M) video interfaces (i.e., 1-M).

Alternatively, each of the GPU systems 528, 578 or 598 may have multiple GPU cards which are linked using scalable linked interfaces (SLI). However, in this instance, only a master GPU card has a video interface (i.e., M-1).

In still another alternative implementation, the GPU cards of a GPU system (e.g., 528) may have a combination of 1-M and M-1 video interface configurations.

The GPU systems 528, 578 and 598 and print controller 500 of FIG. 5 may be required when a single GPU card (e.g., 138) cannot render images as fast as the print engine (i.e., comprising the engine controller 187 and print head controller 188) can output the rendered images. The GPU systems 528, 578 and 598 of FIG. 5 may be used when the video interface 115 has insufficient bandwidth to transport the rendered images as fast as the print engine can output the rendered images.

Each GPU system 528, 578 or 598 of the module 101 may be associated with one or more swathes. In this instance, each swathe is associated with one GPU system.

The conversion of PDL data to 3D drawing commands creates a plurality of streams of 3D drawing commands. Each stream of 3D drawing commands may be assigned to one of the GPU systems 528, 578 and 598. Each GPU system 528, 578 or 598 renders the images required for the swathe associated with that GPU system 528, 578 or 598, in parallel with one another.

The print controller 500 comprises a swathe controller (e.g., 540) for each GPU system (e.g., GPU system 528). Each swathe controller 540, 570 or 590 contains one or more video receivers, 552 or 553, a spool 554 and a print head controller 580 that controls print heads associated with the swathe. In one implementation, each video receiver 552 or 553, may have an associated spool 554 or another spool (not shown in FIG. 5), respectively. Each swathe controller 540, 570 or 590 may be configured for synchronising a plurality of tiles 650 obtained from dividing a complete swathe into multiple tiles (e.g., Swathe 1, Swathe 2 or Swathe 3) with one another.

Each print head controller (e.g., 580) connects to a single engine controller 556. The engine controller 556 signals each print head controller (e.g., 580) of each swathe controller (e.g., 540, 570, 590) when to mark paper being printed. In one implementation, the engine controller 556 signals each print head controller of the swathe controllers (e.g., 570, 580, 590) to print the rendered tiles on the paper when all the rendered tiles 650 in the same band 660 across the width of a web to be printed have been received. The print head controller (e.g., 580) is synchronised with other print head controllers to output the rendered tiles 650 in the same band.

In another implementation, the engine controller 556 signals each print head controller (e.g., 580) to initiate the marking of the page, as the rendered tiles 650 have been received in order (e.g., from left to right of a band 660 across the width of the web to be printed).

As described above, extra information or metadata 220 may be associated with each output image 205 in the frame buffer configured within the memory 179. Similar to the video receiver 185, the video receivers 552 and 553 read the metadata 220 in the output image 205 and add a printable image area 230 to the spool 554. The engine controller 556 coordinates the outputting of each of the image spools (e.g., spool 554 and spools from the swathe controllers 570 and 590) via the associated print head controllers.

In one implementation, the computer module 101 may comprise a plurality of CPUs, each connecting to a plurality of GPU systems (e.g., 528, 578 and 598). A plurality of CPUs configured in such a manner allows maximum scalability of a high performance print system.

In an alternative implementation, a post-rendering process (e.g., colour conversion and dithering) may be performed on a tile after the tile has been rendered using a GPU card. The pixel data produced from such post-rendering is placed in the frame buffer configured within memory 179 to be transferred to the swathe controller 540. The size of pixel data after post-rendering has been performed on the pixel data may be smaller than the size of the frame buffer configured within memory 179. For example, pixels may be dithered from eight (8) bpp (bits per pixel) to two (2) bpp reducing the pixel data size by three quarters (¾).

In one implementation, a plurality of dithered tiles or images may be compacted into one frame and sent to the video receiver 185 within a frame.

Figure 7:
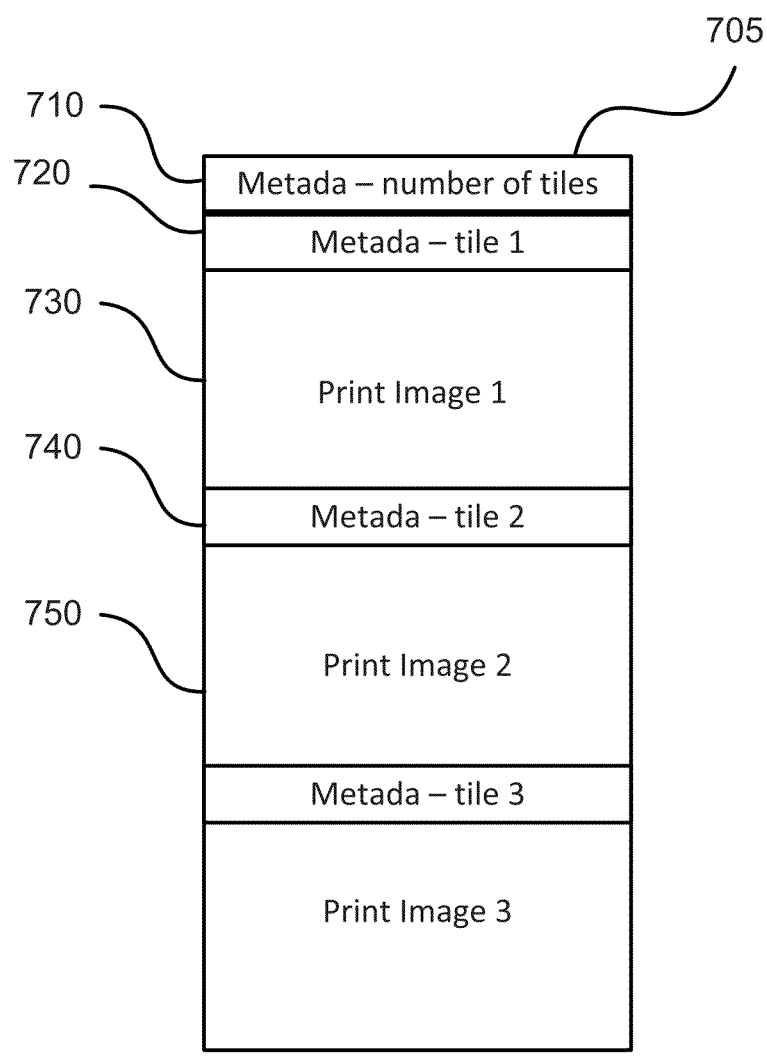
FIG. 7 is a data structure of a frame containing a plurality of rendered tiles.

The video receiver 185 requires extra information to extract a plurality of tiles from a frame. Such extra information may include the number of tiles in a frame and location of each tile. The number of tiles and the size of the pixel data for each tile may be contained in a higher-level of metadata 710 of a frame 705 as shown in FIG. 7. Each rendered tile may be associated with metadata (e.g., 720, 740) and associated print images (e.g., 730, 750). In the example of FIG. 7, the metadata 720 is associated with the print image 730 and the metadata 740 is associated with the print image 750.

In one implementation, the GPU card 138 comprises an intermediate buffer, called a render spool, configured within GPU memory 179. The GPU card 138 may alternatively comprise textures to spool more than one rendered tile. The frame buffer in the GPU memory 179 may be configured using a double buffering method. A render frame buffer may be used to retain rendered pixels while a transmit frame buffer contains pixel data transferred out of the GPU card 138 via the video interface 115.

Figure 8:
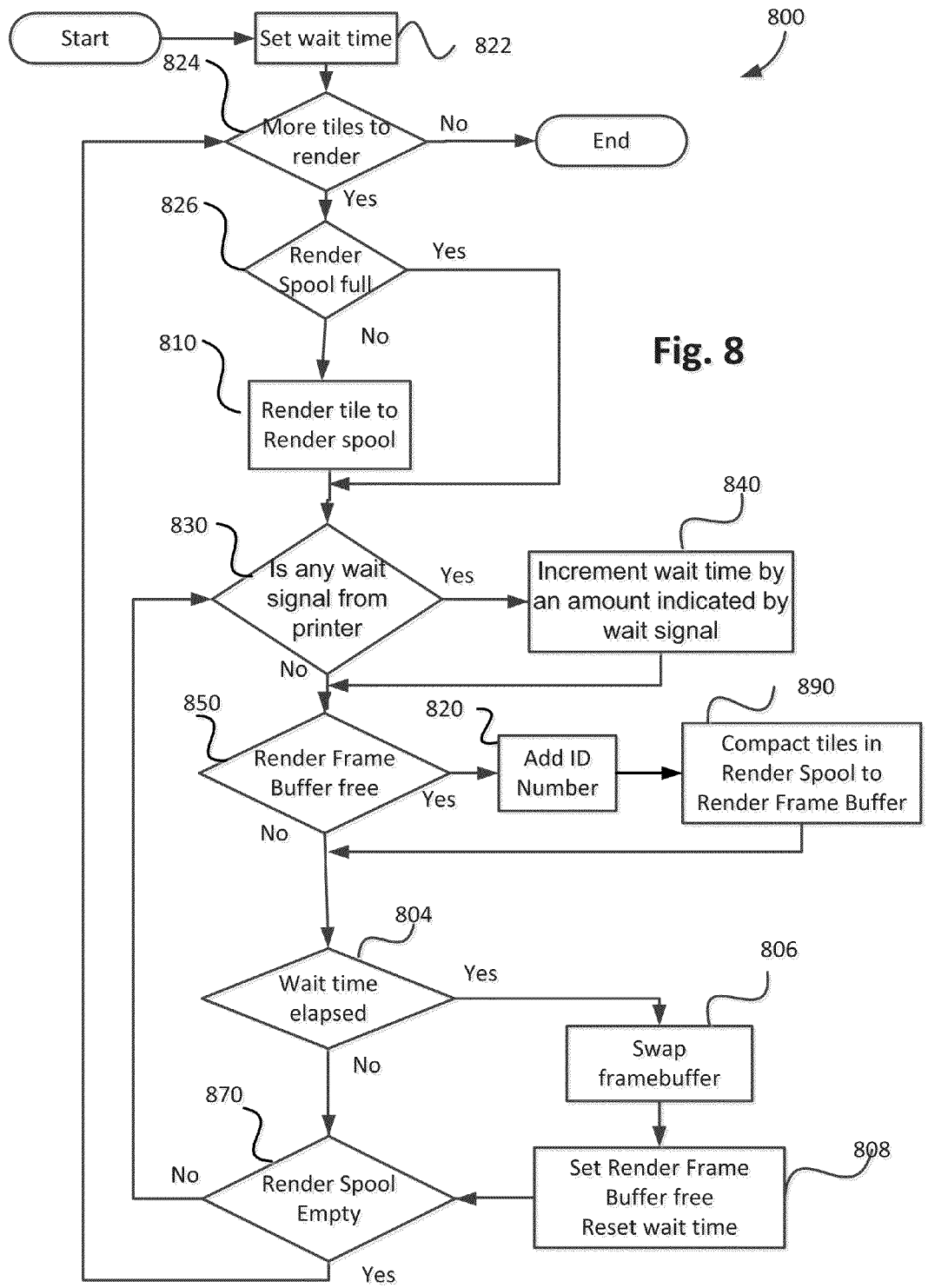
FIG. 8 is a flow diagram showing a method of spooling rendered tiles.

A method 800 of spooling rendered tiles will now be described with reference to FIG. 8. The method 800 may be implemented as one or more code modules of the software application program 133 and being controlled in its execution by the CPU 105.

In accordance with the method 800, if there is more than one dithered tile in the render spool configured within the memory 179 and each of the dithered tiles has a smaller size than the original size of an associated rendered tile, then a number of the dithered tiles may be compacted into the render frame buffer. The compacting occurs if the render frame buffer is not ready to receive any data.

The method 800 begins at step 822, where the CPU 105 sets an initial wait time. Then, at decision step 824, the CPU 105 determines if there is a tile to render. If there is no tile to render, then the method 800 concludes. Otherwise, if there is a tile to render, then the method 800 proceeds to step 826.

At decision step 826, the CPU 105 determines if the render spool configured within the GPU memory 179 is full. If the render spool is not full, then the method 800 proceeds to step 810. At step 810, the CPU 105 issues a render command to the GPU card 138 to render the tile and then dither the rendered tile to the render spool configured within GPU memory 179. The dithering method may be implemented with the compute uniform device architecture (CUDA). If the CPU 105 determines that the render spool is full at step 826, then the method 800 proceeds directly to step 830. At decision step 830, the CPU 105 checks if there has been any wait signal received (as at step 398) from the engine controller 187 of the printer 181. If a wait signal has been received by the CPU 105, the method 800 proceeds to step 840. Otherwise, if the CPU 105 has not detected any wait signal from the printer 181, then the method 800 proceeds to step 850.

At step 840, the CPU 105 increments the wait time by an amount indicated by the wait signal received from the engine controller 187 of the printer 181.

Then the method 800 proceeds to next decision step 850. At decision step 850, if the CPU 105 determines that the render frame buffer is free (i.e., contents of the frame buffer have already been swapped to the transmit frame buffer by the GPU card 138), then the method 800 proceeds to adding step 820. Otherwise, if the render frame buffer is not free, then the method 800 proceeds to step 804.

At adding step 820, the CPU 105 adds a new identification number (or attribute) of the frame, including the number of tiles to be included in the frame, to the metadata 710 of an output image 750. Also, band identification numbers (band IDs), to specify which band each rendered tile is located in, are added to the metadata 220 at step 920.

Then at compacting step 890, the CPU 105 compacts the dithered tiles from the render spool to an output image or to the frame 705 as seen in FIG. 7. For example, a first dithered tile may be copied to print image 1 area 730 of the frame 705, and a second dithered tile may be copied to print image 2 area 750. Metadata 720 for the first tile and metadata 740 for the second tile are also created in step 890. In particular, at compacting step 890, the CPU 105 determines the maximum number of tiles that can be compacted into a frame configured within memory 179. Once the maximum number of tiles has been determined the CPU 105 copies a number of tiles from the render spool into the frame 705 at step 890. The actual number of tiles copied into the frame 705 is equal to or less than the maximum number of compacted tiles allowed, depending on the number of tiles spooled in the render spool configured within GPU memory 179. The actual number of tiles may be written by a GPU command, in accordance with the compute unified device architecture (CUDA), from the GPU card 128 to the top-level metadata (e.g., metadata 710) associated with the frame 705 configured within memory 179.

At step 804, the CPU 105 determines if the wait time has elapsed (i.e., the data in the transmit frame buffer has been received by the video receiver 185). If the CPU 105 determines that the wait time has elapsed, then the method 800 proceeds to step 806. Otherwise, the method 800 proceeds to step 870.

At swapping step 806, the CPU 105 swaps the content of the render frame buffer configured within the GPU memory 179 to the transmit frame buffer configured within memory 179 using an OpenGL command from the GPU card 138.

Then at setting step 808, the CPU 105 sets a flag indicating that the render frame buffer is free. Also at step 808, the CPU 105 resets the wait time to the initial wait time. Then the method 800 proceeds to step 870.

At decision step 870, the CPU 105 determines if the render spool is empty. If there are more tiles in the render spool configured within memory 179, then more compact actions and swapping buffers are required and the method 800 returns to step 830. Otherwise, if the render spool is empty, then the method 800 returns to step 824 to render more tiles.

The method 800 may be also implemented asynchronously. For example, instead of polling the wait signal at step 830 to continue step 840 or step 850, a wait signal arriving at the CPU 105 from the printer 181 may trigger step 840. If an asynchronous method is used for the method 800, the control flow and the steps may be changed accordingly.

Both method 400 and method 800 may be modified to handle error signals from the engine controller 187 of the printer 181.

Figure 9:
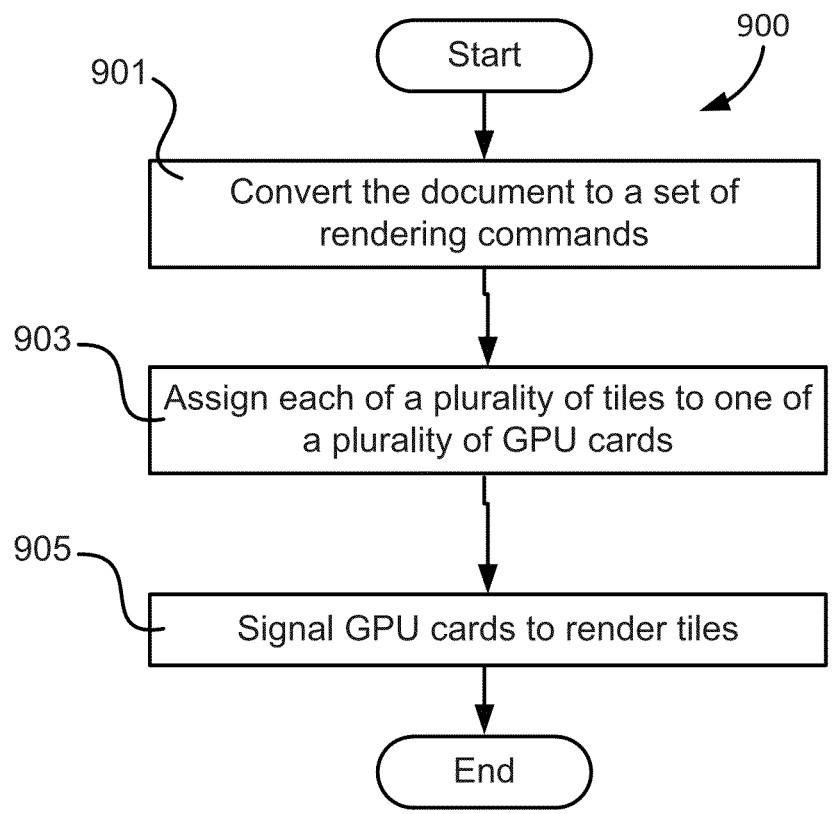
FIG. 9 is a flow diagram showing a method of rendering a document in page description language format using a plurality of graphical processing units.

A method 900 of rendering a document in page description language format using a plurality of graphics processing unit (GPU) cards (or graphics processing units) will now be described with reference to FIG. 9. The method 900 will be described with reference the GPU systems 528, 578 and 598, and the print controller 500 of FIG. 5. One or more steps of the method 900 may be implemented as one or more software code modules of the software application program 133 and/or the software application program 178.

The method 900 begins at step 901, where at least CPU 105 is used for converting the document data to a set of drawing commands corresponding to a plurality of bands. Each of the plurality of bands includes a plurality of tiles and each of the tiles included in a band is associated with a plurality of swathes (i.e., swathe 1, swathe 2, swathe n). Each tile represents at least a portion of the document.

At the next step 903, the CPU 105 is used for assigning each of the plurality of tiles to one of the plurality of graphics processing unit (GPU) in a GPU system 528, 578 or 598 in accordance with a swathe associated with each of the plurality of tiles.

Then at step 905, the CPU 105 sends a signal to each of the assigned GPU systems 528, 578 or 598. In response to receipt of the signal, each assigned graphics processing unit (GPU) card in GPU system 528, 578 or 598, operating in parallel with one another, start rendering one or more of the plurality of tiles representing the document into the memory 179. Each of the rendered tiles has a band identification number (band ID), in the form of an identifier, identifying which band each rendered tile is located in as described above with reference to FIGS. 2 and 7.

The plurality of rendered tiles are transmitted from the assigned GPU cards in GPU systems 528, 578 and/or 598 to each of the corresponding print head controllers (e.g., 580), bypassing the central processing unit (CPU) 105. The rendered tiles are transmitted by the GPU cards in the GPU systems 528, 578 and/or 598 at a higher frequency than a frequency at which the plurality of tiles is output from the print head controller 580. One of the transmitted tiles may be discarded. Such discarded tiles are identified by one of the print head controllers (e.g., 580) by referring the band ID of the tiles as being a duplicate. Tiles associated with the band ID (e.g. band ID=2) may continue to be transmitted and discarded until the corresponding print head controllers (e.g., 580) completes output of the previous band (e.g. band ID=1). The rendered tiles forming a complete band are output from one of the print head controllers (e.g., 580) for the rendered tiles.

INDUSTRIAL APPLICABILITY

The arrangements described are applicable to the computer and data processing industries and particularly for high-speed high volume printing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of printing document data in page description language format using a plurality of graphics processing units via a video interface, said method comprising:

converting the document data to a set of rendering commands corresponding to a plurality of bands, using at least one central processing unit, wherein each of the plurality of bands includes a plurality of tiles and each of the tiles included in a band is associated with one of a plurality of swathes;

assigning each of the plurality of tiles to a corresponding one of the plurality of graphics processing units in accordance with a swathe associated with each of the plurality of tiles;

rendering the plurality of tiles representing the document using the assigned graphics processing units in parallel with one another;

transmitting the rendered tiles from each of the assigned graphics processing units to a corresponding one of a plurality of print head controllers, bypassing the central processing units, wherein the rendered tiles are transmitted at a higher frequency than a frequency at which the plurality of tiles is output from each print head controller, and the rendered tile from each of the assigned graphics processing units is repeatedly transmitted until the each print head controller completes output of the previous band; and outputting, from each of the print head controllers, the rendered tiles forming a complete band for printing the rendered tiles.

2. A method according to claim 1, wherein the print head controllers are synchronised with each other to output the rendered tiles in the same band.

3. A method according to claim 1, wherein the print head controller communicates with each graphics processing unit via a bidirectional communication channel.

4. A method according to claim 1, wherein each of the rendered tiles is associated with a band identification number to identify which band each rendered tile is located in.

5. A method according to claim 1, wherein duplicates of the rendered tiles of a current band are repeatedly discarded until each print head controller completes output of the previous band.

6. The method according to claim 1, further comprises identifying a plurality of duplicates of a rendered tile of a current band in response to constant rate transmission of the rendered tile from one of the graphics processing units via the video interface; and
discarding the identified duplicates of the rendered tile until the each print head controller completes output of the previous band.

7. The method according to claim 6, wherein the identifying the plurality of duplicates is performed by a video receiver associated with the print head controller, bypassing the central processing units issuing the rendering commands.

8. The method according to claim 7, wherein the identifying the plurality of duplicates is performed by the video receiver repeatedly at a frequency rate of the video interface.

9. The method according to claim 1, wherein the rendered tile from each of the graphics processing units is repeatedly transmitted at a frequency rate of the video interface.

10. The method according to claim 9, wherein each rendered tile is transmitted via the video interface, bypassing the central processing units, to one of the plurality of print head controllers corresponding to the swathe associated with said tile.

11. The method according to claim 1, wherein each swathe spans the plurality of bands, the each swathe is printed using a plurality of colour channels by a plurality of print heads controlled by one of the plurality of print head controllers corresponding to said swathe.

12. The method according to claim 11, wherein each print head controller controls a plurality of print heads to release ink for printing a plurality of colour channels for the corresponding swathe.

13. The method according to claim 1, further comprises:
storing, by a swathe controller, unique rendered tiles for a particular swathe;
printing the stored tiles simultaneously with printing the rendered tiles for a same band output from other swathe controllers.

14. The method according to claim 1, wherein the assigning each of the plurality of tiles to the corresponding one of the plurality of graphics processing units further comprises:
selecting a graphics processing unit associated with a first swathe to render a tile of a second swathe;
rendering the tile by the selected graphics processing unit;
transferring the rendered tile to a graphics processing unit associated with the second swathe to be printed using a swathe controller corresponding to the second swathe.

15. A system for printing document data in page description language format using a plurality of graphics processing units via a video interface, said system comprising:
a memory for storing data and a computer program;
a processor coupled to said memory for executing said computer program, said computer program comprising instructions for:
converting the document data to a set of rendering commands corresponding to a plurality of bands, using at least one central processing unit, wherein each of the plurality of bands includes a plurality of tiles and each of the tiles included in a band is associated with one of a plurality of swathes;
assigning each of the plurality of tiles to a corresponding one of the plurality of graphics processing units in accordance with a swathe associated with each of the plurality of tiles;
rendering the plurality of tiles representing the document using the assigned graphics processing units in parallel with one another;
transmitting the rendered tiles from each of the assigned graphics processing units to a corresponding one of a plurality of print head controllers, bypassing the central processing units, wherein the rendered tiles are transmitted at a higher frequency than a frequency at which the plurality of tiles is output from each print head controller, and the rendered tile from each of the assigned graphics processing units is repeatedly transmitted until the each print head controller completes output of the previous band; and
outputting, from each of the print head controllers, the rendered tiles forming a complete band for printing the rendered tiles.

16. A non-transitory computer readable medium having a computer program stored thereon for printing document data in page description language format using a plurality of graphics processing units, said program comprising:
code for converting the document data to a set of rendering commands corresponding to a plurality of bands, using at least one central processing unit, wherein each of the plurality of bands includes a plurality of tiles and each of the tiles included in a band is associated with one of a plurality of swathes;
code for assigning each of the plurality of tiles to a corresponding one of the plurality of graphics processing units in accordance with a swathe associated with each of the plurality of tiles;
code for rendering the plurality of tiles representing the document using the assigned graphics processing units in parallel with one another;
code for transmitting the rendered tiles from each of the assigned graphics processing units to each of a corresponding one of a plurality of print head controllers, bypassing the central processing units, wherein the rendered tiles are transmitted at a higher frequency than a frequency at which the plurality of tiles is output from each print head controller, and the rendered tile from each of the assigned graphics processing units is repeatedly transmitted until the each print head controller completes output of the previous band; and
code for outputting, from each of the print head controllers, the rendered tiles forming a complete band for printing the rendered tiles.

17. A method of printing document data in page description language format using a plurality of graphics processing units via a video interface, said method comprising:
converting, using a central processing unit, the document data to a set of rendering commands for a plurality of tiles organized in a plurality of bands, wherein each of the tiles corresponds to one of a plurality of swathes having a width smaller than a width of an output paper;

rendering, in parallel with one another, each of the plurality of tiles in accordance with the rendering commands using one of the graphics processing units, wherein the graphics processing units are assigned to render the tiles on the basis of the corresponding swathes;

repeatedly transmitting duplicates of at least one rendered tile, via the video interface, from each of the graphics processing units, bypassing the central processing unit, until each print head controller completes output of the previous band, wherein the duplicates are transmitted to a corresponding one of a plurality of print head controllers at a frequency rate associated with the video interface; and outputting, from each of the print head controllers, the rendered tiles for printing the document.

\* \* \* \* \*